Figure 1:
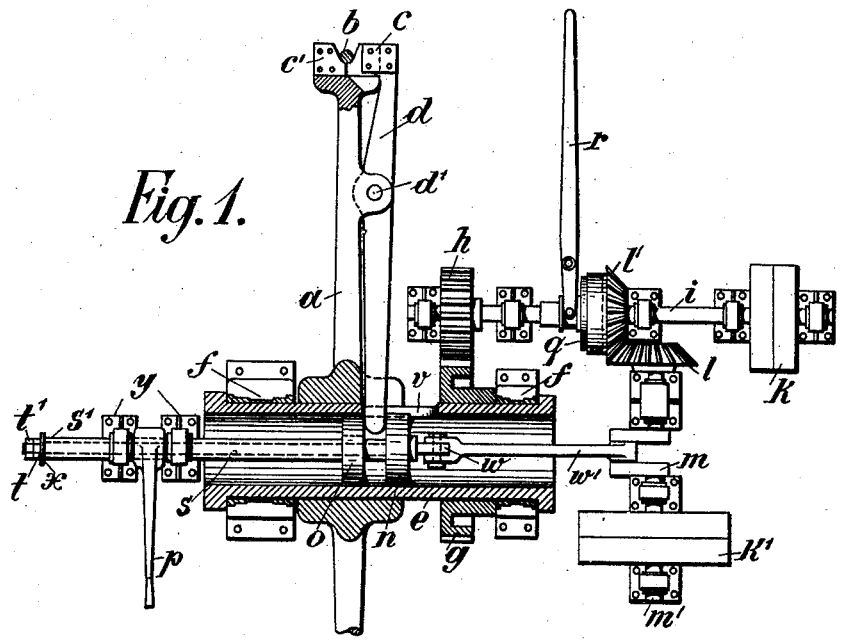

P. HILGERS.
ROTARY BAR CUTTER.
APPLICATION FILED FEB. 24, 1910.

976,653.

Patented Nov. 22, 1910.

Witnesses:
Wilhelm Hilgers.
Frieda Tellering.

Inventor:
Peter Hilgers

UNITED STATES PATENT OFFICE.

PETER HILGERS, OF SAARBRÜCKEN, GERMANY.

ROTARY BAR-CUTTER.

976,653.

Specification of Letters Patent.   Patented Nov. 22, 1910.

Application filed February 24, 1910.   Serial No. 545,740.

*To all whom it may concern:*

Be it known that I, PETER HILGERS, a citizen of the Empire of Germany, residing at Saarbrücken, in the Empire of Germany, have invented a new and useful Rotary Bar-Cutter, of which the following is a specification.

There are known rotary bar cutters adapted to cut rolled bars as they come out of rolling mills, but they present various defects. Some of them are adapted to cut the bars only during their rotation and not during their standstill. Moreover they are adapted to cut off only pieces of the same length, not of a varying length. Sometimes they are so arranged that after certain periods they can be prevented from cutting, so that in this manner pieces of different lengths can be cut off the bars. However, they can cut only during their rotation.

My invention relates to improvements in such rotary bar cutters, whereby they are enabled to cut the bars during their rotation as well as during their standstill, and to divide the bars into pieces of any length.

The chief improvement consists in two distinct driving gears, of which one is adapted to set a rotary shear bearer to rotate and to stop it, while the other driving gear serves for actuating the movable knife disposed in the rotary shear bearer, either during the rotation or during the standstill of the latter.

Another improvement consists in a device for connecting together and disconnecting at will the two driving gears, so that in the former case either of the two driving gears is not driven separately but is driven by the other gear. A hollow axle is mounted in suitable bearings to turn and is adapted to be driven by the said first driving gear, it carrying the rotary shear bearer and having one or several slits through which the inner end or ends of a radially disposed lever or levers actuating the movable knife or knives can engage. Two pistons are mounted in the hollow axle to turn and to reciprocate and one of them is adapted to be driven from the second driving gear and is revolubly connected with the other piston which has one or several cuts in its periphery. Between the two pistons the said end or ends of the knife actuating lever or levers is or are made to engage. A handle disposed without the hollow axle is adapted to displace the piston having the cut or cuts with regard to the other piston, so as to permit the end or ends of the lever or levers to pass through the cut or cuts, when no cutting is to be effected, or to enable the piston to engage the lever end or ends for effecting the cutting.

Other improvements will be hereinafter set forth and pointed out in the claims.

I will now proceed to describe my invention with reference to the accompanying drawing, in which—

Figure 2:
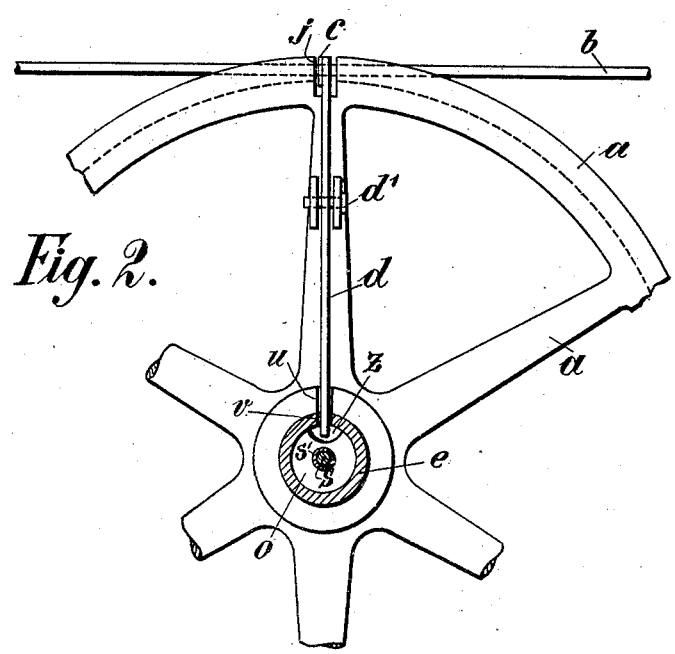

Figure 1 is a horizontal section through the hollow axle and the rotary shear bearer and a plan view of the two driving gears and the device for connecting and disconnecting them, the horizontal bar to be cut being assumed to be vertical for the sake of clearness, and Fig. 2 is an elevation of a part of the rotary shear bearer and a part of the horizontal bar to be cut.

Similar letters of reference refer to similar parts in both views.

A hollow axle $e$ is mounted in two suitable bearings $f\,f$ to turn and has fastened on it in any known manner a rotary shear bearer $a$, which is similar to a rope pulley and is shown to have a radially disposed two-armed lever $d$. This lever $d$ is mounted on a pin $d^1$ at one arm of the bearer $a$ to rock and carries at the free end of its outer arm a knife $c$, which is adapted to work together with a stationary knife $c^1$ fastened in a cut $j$ in the periphery of the bearer $a$. The free end of the inner arm of the lever $d$ passes through a slot $u$ in the nave of the bearer $a$ and through a slot $v$ provided in the hollow axle $e$. Two pistons $n$ and $o$ are mounted in the hollow axle $e$ to turn and to reciprocate. One piston $n$ is rigidly connected with a rod $s$ on one side and with an eye $w$ on the other side. The other piston $o$ is fastened on a tube $s^1$ turnable on the rod $s$ and prevented from longitudinal motion thereon by the piston $n$ on the one hand and by a disk $x$ on the other hand, the disk $x$ being made in one piece with a nut $t$ engaging a screw-thread at the end of the rod $s$ and secured by a counter-nut $t^1$. The piston $o$ has in its periphery a cut $z$ (Fig. 2), through which the free end of the inner arm of the lever $d$ can pass. The tube $s^1$ is mounted in two suitable bearings $y\,y$ to turn and to longitudinally move. A handle $p$ is put on the tube $s^1$ between the two bearings $y\,y$ and is in any known manner prevented from turning on the tube $s^1$. A crank shaft $m^1$ is mounted in suitable bearings to turn at right angles to the hollow axle $e$ and its crank $m$ is connected with the eye $w$ at the piston $n$ by a connecting rod $w^1$. Two pulleys $k^1$, one fast and the other loose, are disposed on the crank shaft $m^1$ and serve for driving or stopping the latter respectively.

Fastened on the hollow axle $e$ is a gear wheel $g$, which meshes with another one $h$ fastened on a countershaft $i$, which is mounted in suitable bearings to turn. Two pulleys $k$, one fast and the other loose, are disposed on the countershaft $i$ and serve for driving the hollow axle $e$ in either direction by means of the two gear wheels $g$ and $h$. A bevel wheel $l$ keyed upon the crankshaft $m^1$ meshes with a like bevel wheel $l^1$, which is loose on the countershaft $i$ and can be at will coupled therewith by means of a friction clutch $q$ or any other clutch. A handle $r$ controls by means of a sleeve the movable member of the clutch $q$.

The rotary bar cutter operates as follows: Normally the crankshaft $m^1$ is set to rotate, so that its crank $m$ by the connecting rod $w^1$ reciprocates the two pistons $n$ and $o$. As is shown at Fig. 1, the connecting rod $w^1$ is made so long as to permit the piston $n$ just to touch in its extreme left position the free end of the inner arm of the lever $d$, which occupies its normal position shown. The handle $p$ is in any known manner so adjusted as to permit the piston $o$ to freely reciprocate without engaging at all the lever $d$. The fast pulley $k^1$ is assumed to be driven and the handle $r$ is assumed to have coupled together the two members of the friction clutch $q$, so that the countershaft $i$ is driven from the crankshaft $m^1$ and the hollow axle $e$ is set to rotate. The gear wheel $h$ may be assumed to have half the diameter of the other gear wheel $g$ and the clutch $q$ is preferably so adjusted, that the lever $d$ can be actuated in its vertical position shown by the piston $o$ for cutting through the bar $b$. When the bar $b$ coming from some rolling-mill passes over the rotating shear bearer $a$ through the groove at its periphery, the operator watching the reciprocating disk $x$ can easily turn his handle $p$ into its other extreme position at the moment, that the disk $x$ reaches its extreme left position and the free end of the lever $d$ engages between the two pistons $n$ and $o$ so that during the following stroke of the piston $o$ from left to right it will actuate the lever $d$ at the proper moment for effecting the cutting through of the bar $b$. Immediately afterward the operator turns his handle $p$ back, so that the lever $d$ will be returned into its initial position by the piston $n$ and henceforward it will remain in its normal position.

Assuming the crankshaft $m^1$ to be alone driven and to be disconnected from the countershaft $i$, which may be at rest, the same as the rotary shear bearer $a$, a bar $b$ coming from some rolling-mill arriving at the apparatus and moving through the groove of the rotary shear bearer $a$ may slowly start the latter. It is easy for the skilled operator watching this to operate his handle $p$ at the proper moment for effecting the cutting through of the bar $b$ at the desired place, so that the piece cut off shall have the approximate desired length. Of course it may be useful to turn the rotary shear bearer $a$ beforehand into a correct position for any bar of a given diameter or strength and the experience will teach the operator how to adjust the bearer $a$. It will be seen, that in this manner the rotary bar cutter is enabled to perform the cutting practically during its standstill.

If the rotary bar cutter is to be employed for bars moving in one and the other direction, such as is for example the case with reversing rolling-mills, three roller high mills, etc., the countershaft $i$ will require to be in any known manner adapted to run in either direction. Then the apparatus can be operated substantially the same as before for cutting bars entering as well as leaving rolling mills.

The rotary bar cutter may be varied in many respects without departing from the spirit of my invention.

I claim:

1. In a rotary bar cutter of the class described, the combination with a rotary hollow axle having a slot, of a grooved pulley fastened on said hollow axle and having a cut in its periphery, a knife fastened in the cut of said pulley, a radial lever mounted on said pulley to rock, its inner end extending through the slot of said hollow axle, a second knife fastened at the outer end of said radial lever and forming with said knife a pair of bar shears, two pistons mounted in said hollow axle to turn and to reciprocate, they being revolubly connected together and one of them having a cut through which the inner end of said lever can pass, means driving said rotary hollow axle, means reciprocating said two pistons, and means displacing the piston having the cut with regard to the other piston in one or the other direction, so as to enable the former piston to actuate said radial lever or to leave it in its normal position.

2. In a rotary bar cutter of the class described, the combination with a rotary hollow axle having a slot, of a grooved pulley fastened on said hollow axle and having a cut in its periphery, a knife fastened in the cut of said pulley, a radial lever mounted on said pulley to rock, its inner end extending through the slot of said hollow axle, a second knife fastened at the outer end of said radial lever and forming with said knife a pair of bar shears, two pistons mounted in said hollow axle to turn and to reciprocate, they being revolubly connected together and one of them having a cut through which the inner end of said lever can pass, a driving gear adapted to drive said hollow axle, a second driving gear adapted to reciprocate said two pistons during the rotation or standstill of said hollow axle, a device connecting and disconnecting at will the two driving gears, so that either of them can be driven by the other one, and means displacing the piston having the cut with regard to the other piston in one or the other direction, so as to enable the former piston to actuate said radial lever or to leave it in its normal position.

3. In a rotary bar cutter of the class described, the combination with a rotary hollow axle having a slot, of a grooved pulley fastened on said hollow axle and having a cut in its periphery, a knife fastened in the cut of said pulley, a radial lever mounted on said pulley to rock, its inner end extending through the slot of said hollow axle, a second knife fastened at the outer end of said radial lever and forming with said knife a pair of bar shears, two pistons mounted in said hollow axle to turn and to reciprocate, they being revolubly connected together and one of them having a cut through which the inner end of said lever can pass, a countershaft adapted to drive said rotary hollow axle and to leave it at liberty, a crank shaft adapted to reciprocate said two pistons and to be driven separately, means for connecting at will said countershaft with said crankshaft and disconnecting them, so that either of them can be alone driven in the former case, and means displacing the piston having the cut with regard to the other piston in one or the other direction, so as to enable the former piston to actuate said radial lever or to leave it in its normal position.

PETER HILGERS.

Witnesses:
 LOUIS VANDORY,
 GERTRUD BONA.